United States Patent
Yun

(10) Patent No.: US 9,219,527 B2
(45) Date of Patent: Dec. 22, 2015

(54) APPARATUS AND METHOD FOR SELECTING PICC IN PORTABLE TERMINAL

(71) Applicant: Samsung Electronics Co. Ltd., Suwon-si, Gyeonggi-do (KR)

(72) Inventor: Chuleun Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 13/667,557

(22) Filed: Nov. 2, 2012

(65) Prior Publication Data

US 2013/0122806 A1 May 16, 2013

(30) Foreign Application Priority Data

Nov. 14, 2011 (KR) .......................... 10-2011-0118114

(51) Int. Cl.
| | |
|---|---|
| *H04B 5/00* | (2006.01) |
| *G06K 19/07* | (2006.01) |
| *G06K 7/00* | (2006.01) |
| *G06K 7/10* | (2006.01) |
| *H04Q 1/00* | (2006.01) |

(52) U.S. Cl.
CPC .. *H04B 5/00* (2013.01); *G06K 7/00* (2013.01); *G06K 7/10237* (2013.01); *G06K 7/10297* (2013.01); *H04Q 1/00* (2013.01)

(58) Field of Classification Search
CPC ....................................................... H04B 5/00
USPC ......... 455/41.1, 558; 235/375, 380, 382, 487, 235/492, 493
See application file for complete search history.

(56) References Cited

U.S. PATENT DOCUMENTS

| | | | | |
|---|---|---|---|---|
| 7,865,141 | B2 * | 1/2011 | Liao et al. ..................... | 455/41.2 |
| 8,254,835 | B2 * | 8/2012 | Lee ............... | 455/41.1 |
| 8,428,513 | B2 * | 4/2013 | Sklovsky et al. ............ | 455/41.2 |
| 8,452,330 | B2 * | 5/2013 | Jolivet .......................... | 455/558 |
| 8,532,704 | B2 * | 9/2013 | Ma et al. ....................... | 455/557 |
| 8,630,585 | B2 * | 1/2014 | Jolivet ......................... | 455/41.1 |
| 8,639,291 | B1 * | 1/2014 | Gailloux et al. ............. | 455/558 |
| 8,699,946 | B2 * | 4/2014 | Jolivet et al. ................. | 455/41.1 |
| 2002/0165677 | A1 * | 11/2002 | Lightbody et al. ............. | 702/62 |
| 2003/0214275 | A1 * | 11/2003 | Biagi ........................... | 323/280 |
| 2005/0088153 | A1 * | 4/2005 | Suzuki ........................ | 323/274 |
| 2006/0280149 | A1 * | 12/2006 | Kuhl et al. .................... | 370/338 |
| 2007/0090815 | A1 * | 4/2007 | Hsieh ........................... | 323/269 |
| 2007/0194928 | A1 * | 8/2007 | Berhorst et al. ........... | 340/572.5 |
| 2007/0274242 | A1 * | 11/2007 | Lamacraft et al. ............ | 370/310 |
| 2008/0001585 | A1 * | 1/2008 | Bakkaloglu et al. .......... | 323/280 |
| 2008/0188178 | A1 * | 8/2008 | Maugars et al. ............. | 455/41.1 |
| 2008/0296975 | A1 * | 12/2008 | Shakespeare et al. .......... | 307/66 |
| 2009/0150704 | A1 * | 6/2009 | Van Bosch .................... | 713/340 |
| 2009/0291634 | A1 * | 11/2009 | Saarisalo ..................... | 455/41.1 |
| 2010/0019033 | A1 * | 1/2010 | Jolivet ......................... | 235/380 |
| 2010/0029202 | A1 * | 2/2010 | Jolivet et al. ................. | 455/41.1 |

(Continued)

*Primary Examiner* — Bobbak Safaipour
*Assistant Examiner* — Devan Sandiford
(74) *Attorney, Agent, or Firm* — Jefferson IP Law, LLP

(57) ABSTRACT

An apparatus and method for selecting a Proximity Interface Coupling Card (PICC) of a portable terminal having a Near Field Communication (NFC) module including multiple PICCs are provided. The method includes activating the NFC module when the portable terminal is at a power-off state, determining whether a key signal for activating one PICC among the multiple of PICCs is inputted in the activated NFC module, and activating the PICC mapped with the inputted key signal when the key signal is inputted.

15 Claims, 4 Drawing Sheets

(56) References Cited

U.S. PATENT DOCUMENTS

| | | | |
|---|---|---|---|
| 2010/0084465 A1* | 4/2010 | Jolivet | 235/439 |
| 2010/0248710 A1* | 9/2010 | Sklovsky et al. | 455/420 |
| 2010/0248783 A1* | 9/2010 | Jolivet | 455/558 |
| 2011/0157929 A1* | 6/2011 | Sun et al. | 363/37 |
| 2011/0171907 A1* | 7/2011 | Jolivet | 455/41.1 |
| 2011/0237190 A1* | 9/2011 | Jolivet | 455/41.2 |
| 2011/0280374 A1* | 11/2011 | Ohta et al. | 378/114 |
| 2011/0294418 A1* | 12/2011 | Chen | 455/41.1 |
| 2012/0135681 A1* | 5/2012 | Adams et al. | 455/41.1 |
| 2013/0005245 A1* | 1/2013 | Royston | 455/41.1 |
| 2013/0052948 A1* | 2/2013 | Fuchs | 455/41.1 |
| 2013/0084799 A1* | 4/2013 | Marholev et al. | 455/41.1 |
| 2013/0085887 A1* | 4/2013 | Zhang | 705/26.8 |

* cited by examiner

APPARATUS AND METHOD FOR SELECTING PICC IN PORTABLE TERMINAL

PRIORITY

This application claims the benefit under 35 U.S.C. §119(a) of a Korean patent application filed on Nov. 14, 2011 in the Korean Intellectual Property Office and assigned Serial No. 10-2011-0118114, the entire disclosure of which is hereby incorporated by reference.

BACKGROUND OF THE INVENTION

1. Field of the Invention

The present invention relates to a method and apparatus for selecting a Proximity Interface Coupling Card (PICC) in a portable terminal. More particularly, the present invention relates to a method and apparatus for selecting a PICC in a portable terminal, which can select a PICC in a state where the power of the portable terminal is off.

2. Description of the Related Art

With rapid development of information communication technologies and semiconductor technologies, distribution and use of portable terminals are rapidly increasing. Currently, a portable terminal is able to provide various functions including multimedia functions such as a TV viewing function (e.g., a mobile broadcast such as a Digital Multimedia Broadcasting (DMB) and a Digital Video Broadcasting (DVB), etc.), a music replay function (e.g., an MP3 file playing function), a video file replay function, etc. as well as general communication functions such as a voice call and a message transmission and reception. Furthermore, a recent portable terminal is able to provide a Near Field Communication (NFC) function. The NFC is a type of Radio Frequency IDentification (RFID) that may be implemented using a non-contact type near field communication module that uses a 13.56 MHz frequency band, and refers to a technology that transmits data between terminals at a short distance of about 10 cm. The NFC is being widely utilized for credit card payments, transmission of goods or travel information, traffic cards, entrance cards, etc. The NFC system may comprise a Proximity Coupling Device (PCD) and a PICC. The PCD refers to a card reader which can recognize a PICC and supply power to the PICC. The PICC refers to a smart card such as a credit card, an entrance card, a traffic card, a mileage card, etc.

Further, the NFC module included in the portable terminal has been developed to include multiple PICCs. For example, a recent NFC module can include a PICC that provides a traffic card function, a PICC that provides a credit card function, a PICC that provides an entrance card function, etc. However, the PCD can only recognize one PICC at a time. That is, a PCD for credit card recognition can only recognize a credit card, and a PCD for traffic card recognition can only recognize a traffic card. Therefore, the user must select the appropriate PICC, and then let the PICC approach the PCD. For example, in order to use a traffic card, the user of the portable terminal must select the PICC that provides a traffic card function from among the multiple PICCs included in an NFC module, and then let the portable terminal approach the PCD.

However, in order to select one PICC among multiple PICCs included in the NFC module, the portable terminal should be at a power-on state because, in a case where the portable terminal is at power-off state, the means for selecting the PICC (e.g., a display unit and an input unit that provide a user interface) is also at a power-off state and thus cannot be used. That is, the user of an existing portable terminal cannot select a desired PICC at a power-off state, and can only use a PICC which is set as default. Hence, in a case where the portable terminal cannot be operated in the state where the battery of the portable terminal becomes lower than a preset value, the user cannot utilize an NFC function as desired.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method and apparatus for selecting a Proximity Interface Coupling Card (PICC) in a portable terminal, which can select a user-desired PICC among multiple PICCs included in a Near Field Communication (NFC) module in the state where the portable terminal is turned off.

In accordance with an aspect of the present invention, a method for selecting a PICC of a portable terminal having an NFC module including multiple PICCs is provided. The method includes activating the NFC module when the portable terminal is at a power-off state, determining whether a key signal for activating one PICC among the multiple PICCs is inputted in the activated NFC module, and activating the PICC mapped with the inputted key signal when the key signal is inputted.

In accordance with another aspect of the present invention, an apparatus for selecting a PICC of a portable terminal is provided. The apparatus includes an NFC module including multiple PICCs, and an input unit for inputting a key signal for activating one PICC among the multiple PICCs when the portable terminal is at a power-off state, wherein the NFC module determines whether the key signal is inputted from the input unit when the NFC module is activated and when the portable terminal is at the power-off state, and activates a PICC mapped with the inputted key signal among the multiple PICCs when the key signal is inputted.

As considered above, according to a method and apparatus for selecting a PICC in a portable terminal according to an exemplary embodiment of the present invention, even if a portable terminal is at a power-off state, a user can select one of a multiple of PICCs included in an NFC module, and use the selected PICC. That is, exemplary embodiments of the present invention can improve user convenience by resolving the existing inconvenience that only a default PICC can be used when the portable terminal is at the power-off state. Further, exemplary embodiments of the present invention can smoothly provide a PICC service through an NFC function of a portable terminal regardless of whether the portable terminal is at the power-on state or the power-off state. As such, exemplary embodiments of the present invention can contribute to PICC service activation through a portable terminal. Further, exemplary embodiments of the present invention can minimize an increase in costs by using a function key included in a portable terminal in order to easily execute a certain function without separately having a function key for PICC selection.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, exemplary embodiments the present invention will be explained with reference to the attached drawings. In the exemplary embodiments of the present invention, a portable terminal is an electronic device including a Near Field Communication (NFC) module having multiple Proximity Interface Coupling Cards (PICCs), and can include a mobile communication terminal, a Personal Digital Assistant (PDA), a smart phone, a personal computer, a Tablet Personal Computer (PC), a Portable Multimedia Player (PMP), etc. Hereinafter, a mobile communication terminal is explained merely as an example for convenience of explanation.

Figure 1:
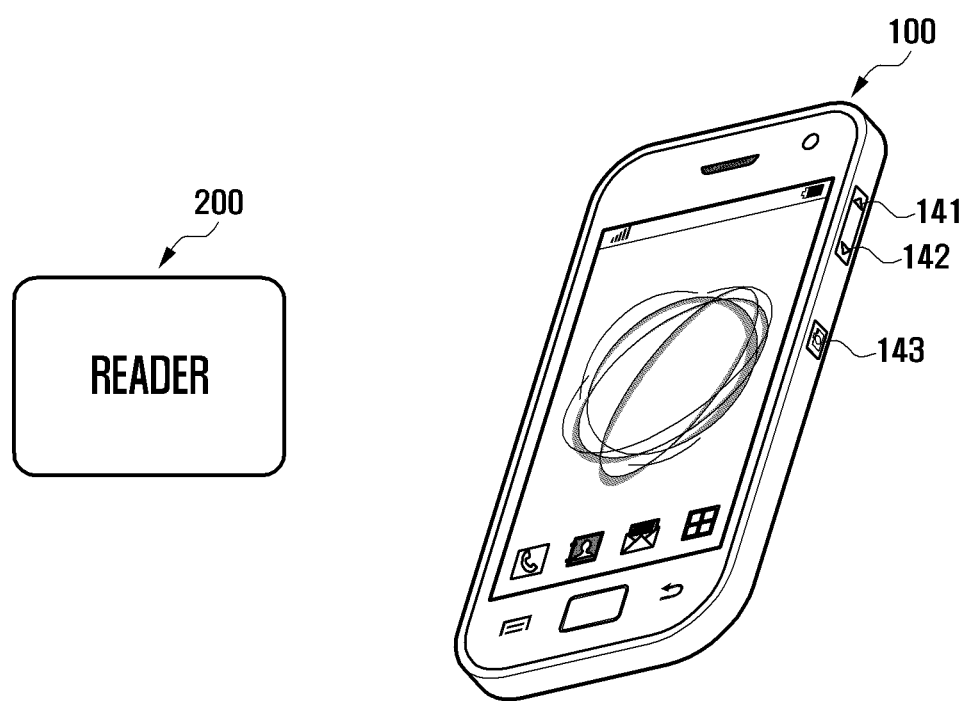
FIG. 1 schematically illustrates a system according to an exemplary embodiment of the present invention.

FIG. 1 schematically illustrates a system according to an exemplary embodiment of the present invention.

Referring to FIG. 1, a system 1000 includes a reader 200 and a portable terminal 100.

The reader 200 is a device that can recognize a contactless card, and may include a Proximity Coupling Device (PCD). For example, the reader 200 can recognize a contactless traffic card, a contactless credit card, a contactless entrance card, a contactless mileage card, etc. However, the reader 200 can only recognize one type of card. For example, in a case where the reader 200 is a credit card reader, a traffic card, an entrance card, a mileage card, etc. cannot be recognized. When a contactless card approaches the reader 200, the reader 200 can supply power to the approached contactless card through resonant inductive coupling, and can communicate with the contactless card. In a case where a portable terminal 100 approaches the reader 200, the reader 200 can supply power to an NFC module (not shown) through resonant inductive coupling, and can communicate with the NFC module (not shown).

The portable terminal 100 can include an NFC module (not shown) that performs contactless near field communication with the NFC module. The NFC module can include multiple PICCs. The NFC module can be activated by being supplied power from the reader 200. More particularly, the portable terminal 100 can activate one PICC among multiple PICCs according to a key signal inputted in a state where power is off. For example, the portable terminal 100 can activate one PICC among multiple PICCs in response to a function key signal input such as a volume up key 141, a volume down key 142, a camera key 143, etc. To this end, the portable terminal 100 according to an exemplary embodiment of the present invention can include a switch unit (not shown) that is switched so that the function keys 141, 142 and 143 are connected to a controller (not shown) at a power-on state, and the function keys 141, 142 and 143 are connected to the NFC module at a power-off state. Further, the portable terminal 100 is connected to a battery (not shown), and can include a voltage division unit (not shown) which can maintain function keys 141, 142 and 143 at pull-up state even when power is off. Likewise, the function keys 141, 142 and 143 maintain pull-up state by the voltage division unit (not shown) even at power-off state, and thus the portable terminal 100 can input key signals in the NFC module. The NFC module can activate one of the multiple PICCs by recognizing an inputted key signal and responding to the recognized key signal. A more detailed description on such a portable terminal 100 will be provided later with reference to FIGS. 2 to 4.

Figure 2:
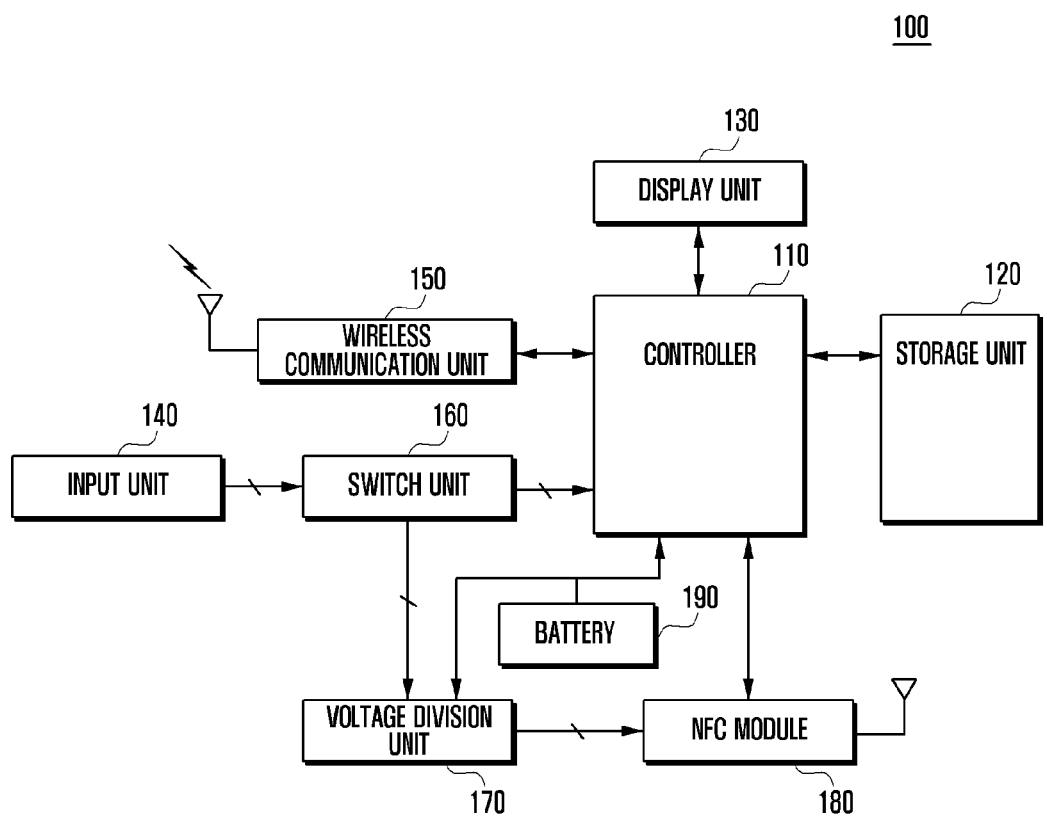
FIG. 2 schematically illustrates a constitution of a portable terminal according to an exemplary embodiment of the present invention.
Figure 3:
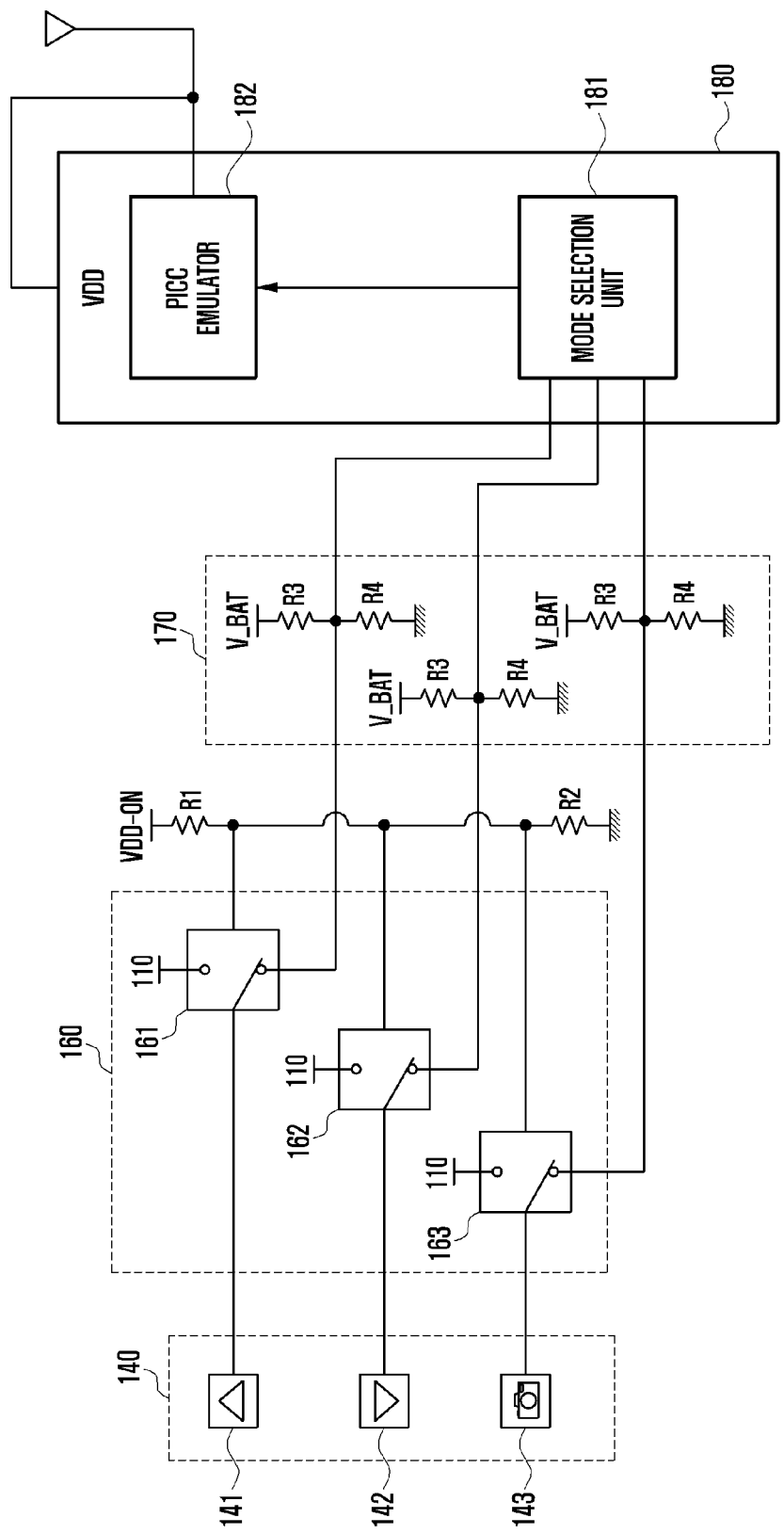
FIG. 3 illustrates an input unit, a switch unit, a voltage division unit and a near field communication module among components of a portable terminal according to an exemplary embodiment of the present invention.

FIG. 2 schematically illustrates a constitution of a portable terminal according to an exemplary embodiment of the present invention, and FIG. 3 illustrates an input unit, a switch unit, a voltage division unit and an NFC module among components of a portable terminal according to an exemplary embodiment of the present invention.

Referring to FIGS. 1 to 3, a portable terminal 100 can include a battery 190, an NFC module 180, a voltage division unit 170, a switch unit 160, a wireless communication unit 150, an input unit 140, a display unit 130, a storage unit 120 and a controller 110.

The wireless communication unit 150 can form a communication channel for a call (e.g., a voice call, a video call, etc.) with a base station and a data communication channel for data transmission. To this end, the wireless communication unit 150 can include a wireless frequency transmission unit (not shown), which frequency-up-converts and amplifies a transmitted signal, a wireless frequency reception unit (not shown), which low-noise amplifies and frequency-downconverts a received signal, a transmission and reception separation unit (not shown), which separates a received signal from a transmitted signal, etc. Further, in a case where the portable terminal 100 does not provide a wireless communication function, the wireless communication unit 150 can be omitted.

The storage unit 120 can store the Operating System (OS) of the portable terminal, application programs which are needed for other optional functions such as a sound replay function, an image or video replay function, a broadcast replay function, etc. as well as data and data transmitted and received during communication. For example, the storage unit 120 can store a key map, a menu map, etc. for operation of a touch screen (not shown). Further, the storage unit 120 can store a video file, a game file, a music file, a movie file, etc. Further, the storage unit 120 can store an NFC module operation program for operation of the NFC module 180. The NFC module operation program can support outputting of a screen for selecting a PICC in the display unit 130 in response to an input signal from an input unit 140. Such an NFC module operation program can be loaded according to the control of the controller 110, and can be activated for operation of the NFC module 180.

The display unit 130 displays information inputted by a user or information to be provided to use as well as various menus of the portable terminal 100. That is, the display unit 130 can provide various screens according to the use of the portable terminal 100, for example, a standby screen (home screen), a menu screen, a message writing screen, a calling screen, a schedule management screen, an address screen, etc. The display unit 130 can display a screen regarding a setting state of the NFC module 180, an icon, an indicator, etc. For example, the display unit 130 can display an icon, an indicator, etc. that indicates a currently activated PICC among multiple PICCs. Further, the display unit 130 can display a screen with which to select one of multiple PICCs included in the NFC module 180. For example, the display unit 130 can display a PICC list from which the user can select one PICC. That is, the user can activate and use an appropriate PICC through the PICC list. Such a display unit 130 can be formed as a Liquid Crystal Display (LCD), an Organic Light Emitted Diode (OLED), an Active Matrix Organic Light Emitted Diode (AMOLED), etc. In a case where the display unit 130 is formed as a touch screen, the display unit 130 can perform a function of an input unit 140.

The battery 190 is a rechargeable secondary battery, and can be manufactured in various forms such as a nickel battery, a cadmium battery, a nickel-cadmium battery, a lithium-ion battery, a lithium-polymer battery, a chemical cell, etc. The battery can supply power to each component of the portable terminal 100. More particularly, the battery 190 is connected to a voltage division unit 170, and can supply power to function keys 141, 142 and 143 of the input unit 140 for selecting a PICC in the state where the portable terminal 100 is turned off. That is, in a case where function keys 141, 142 and 143 are not inputted in the state where the portable terminal 100 is at power-off state, a high signal can be inputted to the NFC module 180 by the power of the battery 190, and, in a case where the function keys 141, 142 and 143 are pushed, a low signal can be inputted to the NFC module 180 by grounding.

The input unit 140 can include input keys and function keys for receiving an input of numbers and various sets of letter information, setting various functions, and controlling functions of the portable terminal. Such an input unit 140 can be formed by one or a combination of input means such as a button-type keypad, a ball joystick, an optical joystick, a wheel key, a touch key, a touch pad, a touch screen 130, etc.

More particularly, the input unit 140 can input a key signal for selecting one of multiple PICCs included in the NFC module 180 when the portable terminal 100 is at power-off state. To this end, the input unit 140 can include at least one key for selecting one PICC among multiple PICCs. The at least one key can be separately prepared. Further, at least one key for selecting the PICC can be a function key included in the portable terminal 100 for easily performing a certain function. For example, the function key can be a volume up key 141, a volume down key 142, and a camera key 143 as illustrated in FIG. 3. In such a case, the function keys 141, 142 and 143 can be connected to the controller 110 through the switch unit 160, or can be connected to the voltage division unit 170. More specifically, the function keys 141, 142 and 143 can be connected to the controller 110 when the portable terminal 100 is at a power-on state, and can be connected to the voltage division unit 170 when the portable terminal 100 is at a power-off state.

The switch unit 160 can switch connection paths of function keys 141, 142 and 143 of the input unit 140 according to the on/off state of power of the portable terminal 100. To this end, the switch unit 160 can include a first switch 161 connected with a first function key (e.g., a volume up key 141), a second switch 162 connected with a second function key (e.g., a volume down key 142), and a third switch 163 connected with a third function key (e.g., a camera key 143). A power source (VDD_ON), which is supplied only when the portable terminal 100 is at the power-on state, can be connected to the control terminal of the first switch 161 to the third switch 163. At this time, the power source (VDD_ON) can be distributed by a first resistance (R1) and a second resistance (R2) connected in series in consideration of the operating voltage of the first switch 161 to the third switch 163, and can be inputted to the control terminal of the first switch 161 to the third terminal 163 as illustrated in FIG. 3. In a case where the power of the portable terminal 100 is on, the first switch 161 to the third switch 163 can be switched to form a first path which connects function keys 141, 142 and 143 with the controller 110 by power source (VDD_ON), and in a case where the power of the portable terminal 100 is off, the power source (VDD_ON) is not supplied to the control terminal of the first switch 161 to the third switch 163, and thus the first switch 161 to the third switch 163 can be switched to form a second path that connects the function keys 141, 142 and 143 with the voltage division unit 170.

Further, FIG. 3 has illustrated that the switch unit 160 is switched according to the on/off of the power source (VDD_ON), but the present invention is not limited to this example. For example, the switch unit 160 can be switched according to the control of the controller 110. That is, if the portable terminal 100 is turned on, the controller 110 can provide a high signal which has a value greater than a preset value to the control terminal of the switch unit 160. At this time, the function keys 141, 142 and 143 can be connected to the controller 110. In contrast, if the portable terminal 100 is turned off, the controller 110 cannot provide a high signal to the control terminal of the switch unit 160. At this time, the function keys 141, 142 and 143 can be connected to the voltage division unit 170.

The voltage division unit 170 is disposed between the switch unit 160 and the NFC module 180, and divides the voltage of the battery 190 so that the voltage value becomes similar to that of the operating voltage of the NFC module. This is for preventing damage to the NFC module 180 by an input of a voltage higher than the operating voltage of the NFC module 180. For example, the voltage division unit 170 may include a serial resistance as illustrated in FIG. 3. The voltage division unit 170 can include a voltage division circuit in response to the number of function keys. The voltage division circuit may include a battery power (V_BAT), a third resistance (R3) and a fourth resistance (R4), and the battery power (V_BAT) can be distributed by the ratio of the third resistance (R3) to the fourth resistance (R4). For example, in a case where the battery power (V_BAT) is 3.4V and the ratio of the third resistance (R3) to the fourth resistance (R4) is 1:2, the voltage division unit 170 can supply the voltage of about 2.2V to the NFC module 180. At this time, the function keys 141, 142 and 143 can be pulled up to 2.2V. The voltage division unit 170 can maintain the pulled-up state of function keys 141, 142 and 143 even in the battery voltage state (e.g., less than 3.4V) which cannot operate the portable terminal 100 because the voltage division unit 170 directly uses the power of the battery 190.

The NFC module 180 is a kind of Radio Frequency IDentification (RFID) that uses a frequency band of 13.56 MHz. More particularly, the NFC module 180 includes multiple PICCs, and can select and activate a PICC according to a key signal received from the input unit 140 in the power-off state of the portable terminal 100. Furthermore, the NFC module 180 can be activated by power supplied by resonant inductive coupling when the NFC module 180 approaches the reader 200, then recognize a key signal inputted from the input signal, and activate a PICC corresponding to the recognized key signal. Such an NFC module 180 can include a mode selection unit 181 and a PICC emulator 182.

The mode selection unit 181 can recognize a key signal (an individual key signal and a combined key signal) inputted from the input unit 140, generate a control signal which is requested to activate a PICC corresponding to the inputted key signal, and transmit the generated control signal to the PICC emulator 182. For example, the mode selection unit 181 can generate a control signal that requests to activate the first PICC in a case where a first function key 141 signal is inputted, and can generate a control signal that requests to activate the second PICC in a case where a second function key 142 is inputted. Further, the mode selection unit 181 can include a timer (not shown) which measures a key input time. In the case of including the timer, the mode selection unit 181 can measure input time of an individual key or a combined key, and generate a control signal that requests to activate another PICC according to the measured input time. For example, in a case where the first function key 141 signal is inputted as a value less than a preset time, the mode selection unit 181 can generate a control signal that requests to activate a first PICC, and in a case where the first function key 141 is inputted as a value greater than a preset time, the mode selection unit 181 can generate a control signal that requests to activate a second PICC. To this end, the NFC module 180 can store each of a multiple of function keys included in the input unit 140 and a mapping table which has mapped a certain PICC with function input time or function key combination. The mapping table may be stored in the mode selection unit 181, the storage unit 120, or may be stored in a separate memory (not shown) included in the NFC module 180.

The PICC emulator 182 can activate one of multiple PICCs included in the NFC module 180 according to the control signal inputted from the mode selection unit 181. For example, the PICC emulator 182 can activate a PICC that provides a credit card function in a case where a first function key 141 signal is inputted, activate a PICC that provides a traffic card function in a case where a second function key 142 is inputted, and activate a PICC that provides an entrance card function in a case where a third function key 143 is inputted. Further, the PICC emulator 182 can activate a PICC for a mileage card function in a case where the first function key 141 and the second function key 142 are inputted together under the control of the mode selection unit 181. As described above, if any one of the multiple PICCs is activated, the PICC emulator 182 can form a communication channel with the reader 200, and transmit user information to the reader 200. The user information can be credit card payment information, traffic card payment information, entrance card information, etc. Further, in a case where a battery 190 is not installed in the portable terminal 100, the mode selection unit 181 cannot recognize a key signal input, and thus the PICC emulator 182 can activate only the default PICC.

The controller 110 can control the general operation of the portable terminal 100, a signal flow between internal blocks of the portable terminal 100, and can perform a data processing function that processes data. The controller 110 controls to output a PICC list screen, where one of the multiple PICCs included in the NFC module 180 can be selected according to the input signal of the input unit 140 when the portable terminal 100 is at the power-on state, in the display unit 130, and controls the NFC module 180 to activate the PICC if the certain PICC is selected. The controller 110 can recognize an input signal of the input unit 140 at the power-on state. For example, the controller 110 can recognize a volume-up key 141, a volume-down key 142 and a camera key 143 at the power-on state.

Further, it was explained in FIG. 3 that the NFC module 180 provides the PICC function only, but the present invention is not limited to this example. That is, the NFC module 180 can include the function of a PCD. In a case where the PCD function is included, the NFC module 180 can operate as the reader 200 according to a user's setting. Further, it was explained in FIG. 3 that the input unit 140 includes three function keys, that the switch unit 160 includes three switches, and that the voltage division unit 170 includes three voltage division circuits, but the present invention is not limited to this example. That is, the input unit 140, the switch unit 160 and the voltage division unit 170 can include one or more function keys, one or more switches and one or more voltage division circuits, respectively. For example, in a case where the NFC module 180 includes four PICCs, the input unit 140, the switch unit 160 and the voltage division unit 170 can include two function keys, two switches, and two voltage division circuits. At this time, the NFC module 180 can activate a first PICC which is set as default in a case where no key signal is inputted, activate a second PICC in a case where a first function key signal is inputted, activate a third PICC in a case where a second function key signal is inputted, and activate a fourth PICC in a case where the first function key and the second function key are inputted together. Further, in another example of the present invention, it is possible to sequentially select each key input using one function key. More specifically, the NFC module 180 first activates a first PICC if power is supplied, activates a second PICC in a case where a function key is inputted in the state where the first PICC is activated, activates the third PICC in a case where a function key is re-inputted in the state where the second PICC is activated, activates the fourth PICC in a case where a function key is re-inputted in the state where the third PICC is activated, and activates the first PICC in a case where a function key is re-inputted in the state where the fourth PICC is activated.

Further, though not illustrated in FIG. 2, the portable terminal 100 can selectively further include components having additional functions such as a camera module for photographing an image, a broadcast reception module for broadcast reception, a digital music source replay module like an MP3 module, a multiple of sensor modules (e.g., an acceleration sensor module, a geomagnetic sensor module, and a motion sensor module, etc.), an Internet communication module for performing an Internet function, etc. Not all such components can be listed because they can be variously modified according to a convergence trend of digital devices, and the portable terminal 100 according to the present invention can further include components of the same level as that of the above mentioned components.

Figure 4:
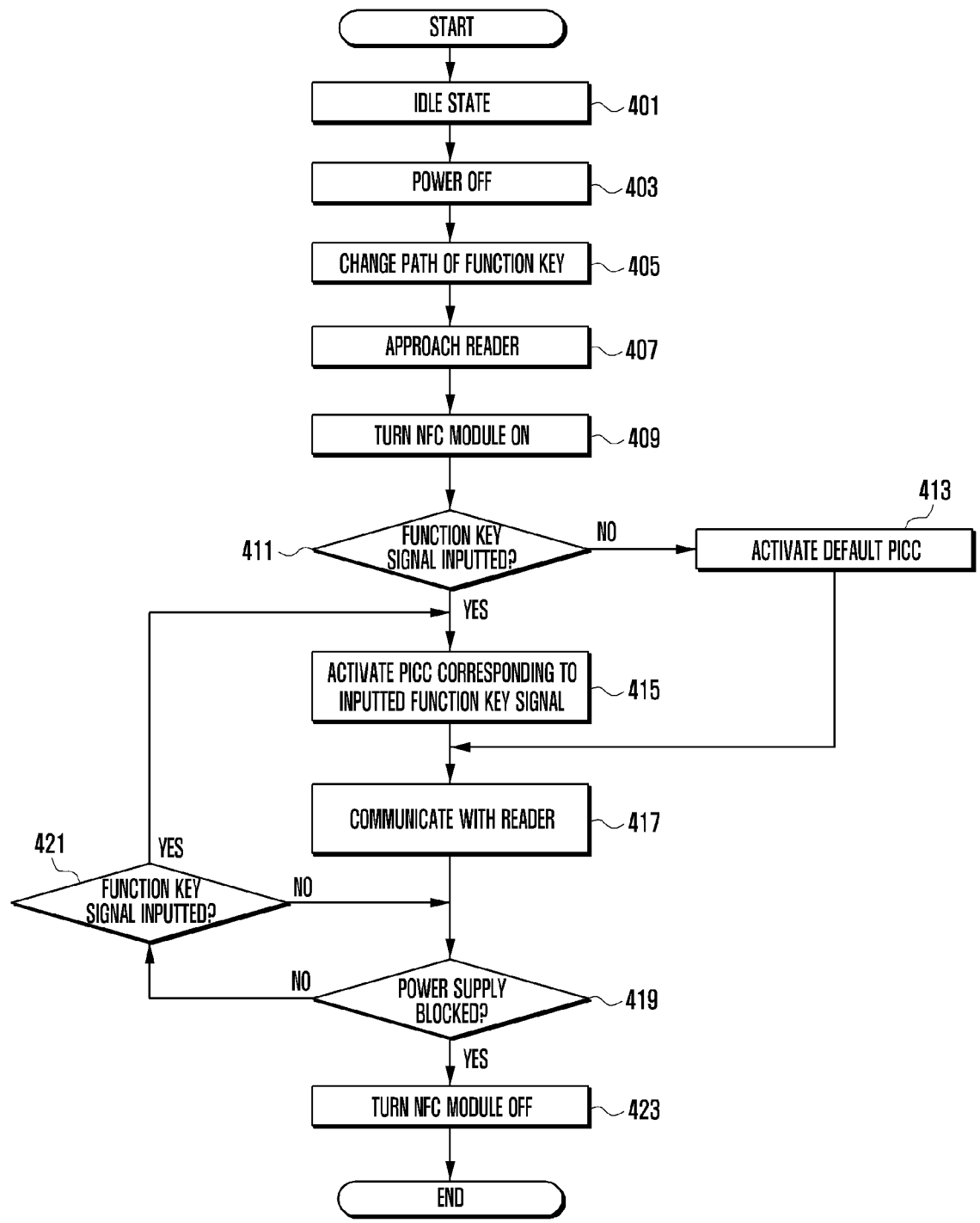
FIG. 4 is a flowchart illustrating a method for selecting a Proximity Interface Coupling Card (PICC) of a portable terminal according to an exemplary embodiment of the present invention.

FIG. 4 is a flowchart illustrating a method for selecting a PICC of a portable terminal according to an exemplary embodiment of the present invention.

Referring to FIGS. 1 to 4, the controller 110 can be at a standby or idle state at step 401. At this time, the function keys 141, 142 and 143 of the input unit 140 are connected to the controller 110 through the switch unit 160. That is, if the power of the portable terminal 100 is turned on, power (e.g., VDD_ON) is supplied to the control terminal of the first switch 161 to the third switch 163, and the first switch 161 to the third switch 163 can form a first path so that a key signal inputted from the input unit 140 is transmitted to the controller 110. The power (e.g., VDD_ON) can be supplied only when the portable terminal 100 is at a power-on state. Thereafter, the portable terminal 100 can be turned off at step 403. The power-off state can occur when the voltage of the battery 190 of the portable terminal 100 becomes lower than a certain level (e.g., 3.4V) or by a user's request.

If the power of the portable terminal 100 is turned off, the switch unit 160 can change the path of the function keys 141, 142 and 143 of the input unit 140 at step 405. More specifically, power (e.g., VDD_ON) is not supplied to the control terminal of the first switch 161 to the third switch 163. Therefore, the first switch 161 to the third switch 163 can be switched to form a second path so that a function key signal inputted from the input unit 140 is transmitted to the voltage division unit 170.

The portable terminal 100 can approach the reader 200 at step 407. In the case of approaching the reader 200, the NFC module 180 of the portable terminal 100 can be activated at step 409. That is, the NFC module 180 can be supplied power by a resonant inductive coupling from the reader.

The NFC module 180 can determine whether a function key signal is inputted at step 411. The function key signal can be generated by one or a combination of function keys 141, 142 and 143. In a case where the function key signal is not inputted, the NFC module 180 can activate a default PICC at step 413, and move to step 417 which will be explained later. In contrast, in a case where the function key signal is inputted, the NFC module 180 can activate a PICC corresponding to an inputted function key signal at step 415. For example, the NFC module 180 activates a PICC for providing a credit card function in a case where a first function key 141 signal is inputted, activates a PICC for providing a traffic card function in a case where a second function key 142 is inputted, activates a PICC for providing an entrance function in a case where a third function key 143 is inputted, etc. Further, the NFC module 180 can activate a PICC for a mileage card function in a case where a first function key 141 signal and a second function key 142 signal are inputted together. To this end, the NFC module 180 can store a mapping table which has mapped each of a multiple of function keys included in the input unit 140, function key input time or a function key combination with a certain PICC.

If a PICC corresponding to the inputted function key signal is activated, the NFC module 180 can communicate with the reader 200 at step 417. That is, the NFC module 180 can transmit activated PICC information to the reader 200, and receive an acknowledgement in response thereto. At this time, the reader 200 can audibly and/or visually notify the user that the information has been approved or rejected.

The NFC module 180 can confirm whether the power supply is blocked at step 419. The blockage of the power supply can occur in a case where the portable terminal 100 is positioned away from the reader 200 by more than a certain distance (e.g., 10 cm). If the power supply is blocked, the NFC module 180 can be turned off at step 423. If the NFC module 180 is turned off, the NFC module 180 can be at a state where only a default PICC is available. Further, if the power supply is not blocked, the NFC module 180 can confirm whether the function key signal is inputted at step 421. If the function key signal is not inputted at step 421, the NFC module 180 returns to step 419, and, in a case where the function key signal is inputted, the NFC module 180 can return to step 415.

Further, though not illustrated in FIG. 4, in a case where the battery 190 is not installed, the function key signal cannot be inputted and thus the user cannot select a desired PICC, but can use a default PICC. That is, if the portable terminal 100 approaches the reader 200 in the state where the battery 190 is not installed, a default PICC of the NFC module 180 can be activated through power supplied from the reader 200.

While the invention has been shown and described with reference to certain exemplary embodiments thereof, it will be understood by those skilled in the art that various forms and details may be made therein without departing from the spirit and scope of the present invention as defined in the appended claims and their equivalents.

What is claimed is:

1. A method for selecting a Proximity Interface Coupling Card (PICC) of a portable terminal,
   wherein the portable terminal includes:
   a Near Field Communication (NFC) module including multiple PICCs;
   an input unit including at least one function key;
   a switch unit; and
   a voltage division unit disposed between the switch unit and the NFC module and connected to a battery, and
   wherein the method comprises:
   activating the NFC module when the portable terminal is at a power-off state;
   determining whether a key signal, for activating one PICC among the multiple PICCs, is provided to the activated NFC module by an activation of the at least one function key in the activated NFC module;
   connecting, by the switch unit, the at least one function key to the voltage division unit when the portable terminal is at the power-off state;
   dividing, by the voltage division unit, a voltage output from the battery to set an operating voltage of the at least one function key; and
   providing the operating voltage of the at least one function key to the NFC module to activate the one PICC, which is mapped with the provided key signal, when the key signal is provided, such that the operating voltage of the at least one function key provided to the NFC module by the voltage division unit is equal to or greater than an operating voltage of the NFC module.

2. The method of claim 1, further comprising activating a default PICC among the multiple PICCs when the key signal is not provided.

3. The method of claim 1, wherein the activating of the NFC module is performed when the portable terminal approaches a reader capable of recognizing the NFC module within a certain distance and when power is supplied to the NFC module by resonant inductive coupling.

4. The method of claim 3, further comprising transmitting information of the activated one PICC to the reader.

5. The method of claim 1, wherein the determining of whether the key signal is provided includes determining whether the key signal is an individual key signal or a combination key signal.

6. The method of claim 5, wherein the determining of whether the key signal is inputted includes measuring an input time of the individual key signal or the combination key signal.

7. The method of claim 1, further comprising:
switching, by the switch unit, such that the key signal is transmitted to a controller when the portable terminal is turned on.

8. An apparatus for selecting a Proximity Interface Coupling Card (PICC) of a portable terminal, the apparatus comprising:
a Near Field Communication (NFC) module including multiple PICCs and configured to determine whether a key signal is provided from an input unit when the NFC module is activated and when the portable terminal is at a power-off state;
the input unit including at least one function key and configured to provide the key signal when the at least one function key is activated to activate one PICC among the multiple PICCs when the portable terminal is at the power-off state;
a switch unit; and
a voltage division unit disposed between the switch unit and the NFC module and connected to a battery,
wherein the switch unit is configured to connect the at least one function key to the voltage division unit when the portable terminal is at the power-off state, and
wherein the voltage division unit is configured to:
divide a voltage output from the battery to set an operating voltage of the at least one function key, and
provide the operating voltage of the at least one function key to the NFC module to activate the one PICC, which is mapped with the provided key signal when the key signal is provided, such that the operating voltage of the at least one function key provided to the NFC module by the voltage division unit is equal to or greater than an operating voltage of the NFC module.

9. The apparatus of claim 8, wherein the NFC module is further configured to activate a default PICC among the multiple PICCs when the key signal is not provided.

10. The apparatus of claim 8, wherein the NFC module is configured to be activated by resonant inductive coupling generated when the portable terminal approaches a reader capable of recognizing the NFC module.

11. The apparatus of claim 10, wherein the NFC module is configured to transmit information of the activated one PICC to the reader when the one PICC mapped with the provided key signal is activated.

12. The apparatus of claim 8, wherein the NFC module comprises:
a mode selection unit configured to:
recognize the key signal provided from the input unit, and
generate a control signal that requests the activation of the one PICC mapped with the recognized key signal; and
a PICC emulator configured to activate the one PICC of the multiple PICCs according to the control signal transmitted from the mode selection unit.

13. The apparatus of claim 8, wherein the switch unit is configured to switch, such that the key signal is transmitted to a controller when the portable terminal is turned on.

14. The apparatus of claim 8, wherein the NFC module is configured to store a mapping table having a certain PICC card mapped with each function key or a key combination of multiple function keys included in the input unit.

15. The apparatus of claim 14, wherein the mapping table is configured to map a different PICC according to an input time of each function key or the key combination of the multiple function keys.

* * * * *